United States Patent
Lee et al.

(10) Patent No.: US 12,047,809 B2
(45) Date of Patent: Jul. 23, 2024

(54) RECONSTRUCTION OF DATA UNIT

(71) Applicant: LG ELECTRONICS INC., Seoul (KR)

(72) Inventors: Youngdae Lee, Seoul (KR); Sunyoung Lee, Seoul (KR); Heejeong Cho, Seoul (KR); Eunjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 335 days.

(21) Appl. No.: 17/296,602

(22) PCT Filed: Jan. 21, 2020

(86) PCT No.: PCT/KR2020/000977
§ 371 (c)(1),
(2) Date: May 25, 2021

(87) PCT Pub. No.: WO2020/159134
PCT Pub. Date: Aug. 6, 2020

(65) Prior Publication Data
US 2022/0022094 A1 Jan. 20, 2022

(30) Foreign Application Priority Data

Jan. 30, 2019 (KR) .................. 10-2019-0012255
Jan. 30, 2019 (KR) .................. 10-2019-0012274
Jan. 30, 2019 (KR) .................. 10-2019-0012292

(51) Int. Cl.
*H04W 28/00* (2009.01)
*H04L 1/1812* (2023.01)
(Continued)

(52) U.S. Cl.
CPC ........... *H04W 28/04* (2013.01); *H04L 1/1812* (2013.01); *H04W 28/065* (2013.01)

(58) Field of Classification Search
None
See application file for complete search history.

(56) References Cited

U.S. PATENT DOCUMENTS 10,582,418 B2 * 3/2020 Tsai ..................... H04L 1/08
11,716,754 B2 * 8/2023 Fujishiro ........... H04W 74/0833
370/329

(Continued)

FOREIGN PATENT DOCUMENTS

WO WO-2007092887 A2 * 8/2007 ........... H04L 1/0061
WO 2014055878 4/2014

OTHER PUBLICATIONS

Qualcomm Inc., Correction to RLC Test case 7.1.2.3.10 AM RLC/Re-transmission of RLC PDU with and without re-segmentation, R5-190165, 3GPP TSG RAN5 Meeting #4-5G-NR Adhoc, Singapore, Singapore, Jan. 15, 2019, sections 7.1.2.3.10.1-7.1.2.3.10.2.

(Continued)

*Primary Examiner* — Gerald A Smarth
(74) *Attorney, Agent, or Firm* — BRYAN CAVE LEIGHTON PAISNER LLP

(57) ABSTRACT

A method and apparatus for reconstruction of a protocol data unit (PDU) for fast and reliable retransmission of a service data unit (SDU) after maximum retransmission is provided. Upon determining that a hybrid automatic repeat request (HARQ) retransmission of a first PDU including a specific SDU is unsuccessful, a wireless device constructs a second PDU including the first SDU which is prioritized to be included in the second PDU.

6 Claims, 17 Drawing Sheets

(51) Int. Cl.
*H04W 28/04* (2009.01)
*H04W 28/06* (2009.01)

(56) References Cited

U.S. PATENT DOCUMENTS

2019/0254059 A1* 8/2019 Gulati ................ H04W 72/542
2020/0221485 A1* 7/2020 Cirik .................. H04L 25/0226
2022/0039156 A1* 2/2022 Golitschek Edler von Elbwart ...
H04W 74/0808

OTHER PUBLICATIONS

Huawei et al., Corrections to EDT for definition, Msg3, preambles, and MAC header structure, R2-1818653, 3GPP TSG RAN WG2 Meeting #104, Spokane, USA, Nov. 17, 2018, sections 3.1-5.4.3.1.
Vivo, Discussion on the switch between CFRA and CBRA, R2-1811898, 3GPP TSG RAN WG2 Meeting #103, Gothenburg, Sweden, Aug. 10, 2018, sections 1-2.2.
Huawei et al., Unnecessary Msg3 rebuilding in case of a retransmission request, R2-1818150, 3GPP TSG RAN WG2 Meeting #104, Spokane, USA, Nov. 2, 2018, sections 1-2.
Section 5.4.2 of 3GPP TS 38.321 V15.4.0.
Section 5.4.3.1 of 3GPP TS 38.321 V15.4.0.
Section 5.11 of 3GPP TS 38.323 V15.4.0.

* cited by examiner

RECONSTRUCTION OF DATA UNIT

This application is the National Stage filing under 35 U.S.C. 371 of International Application No. PCT/KR2020/000977 filed on Jan. 21, 2020, which claims priority to Korean Patent Application Nos. 10-2019-0012255 filed on Jan. 30, 2019; 10-2019-0012292 filed on Jan. 30, 2019 and 10-2019-0012274 filed on Jan. 30, 2019, the contents of which are hereby incorporated by reference herein in their entirety.

TECHNICAL FIELD

The present disclosure relates to reconstruction of a protocol data unit (PDU) for fast and reliable retransmission of a service data unit (SDU) after maximum retransmission.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In NR, there is a need for reconstructing a data unit for fast and reliable retransmission, especially when the data unit requires high reliability and low latency.

In an aspect, a method for a wireless device in a wireless communication system is provided. The method includes, upon determining that a hybrid automatic repeat request (HARQ) retransmission of a first protocol data unit (PDU) including a specific service data unit (SDU)is unsuccessful, constructing a second PDU including the first SDU which is prioritized to be included in the second PDU.

In another aspect, an apparatus for implementing the above method is provided.

The present disclosure can have various advantageous effects.

For example, a wireless device performing HARQ transmission by using radio resources for delivery of a packet requiring low latency and high reliability can quickly retransmit the packet by reconstructing a new MAC PDU, in particular when the packet is prioritized by the network and radio resource is available for transmission of the reconstructed MAC PDU.

For example, the system can provide fast and reliable delivery of data transmission for a wireless device performing HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
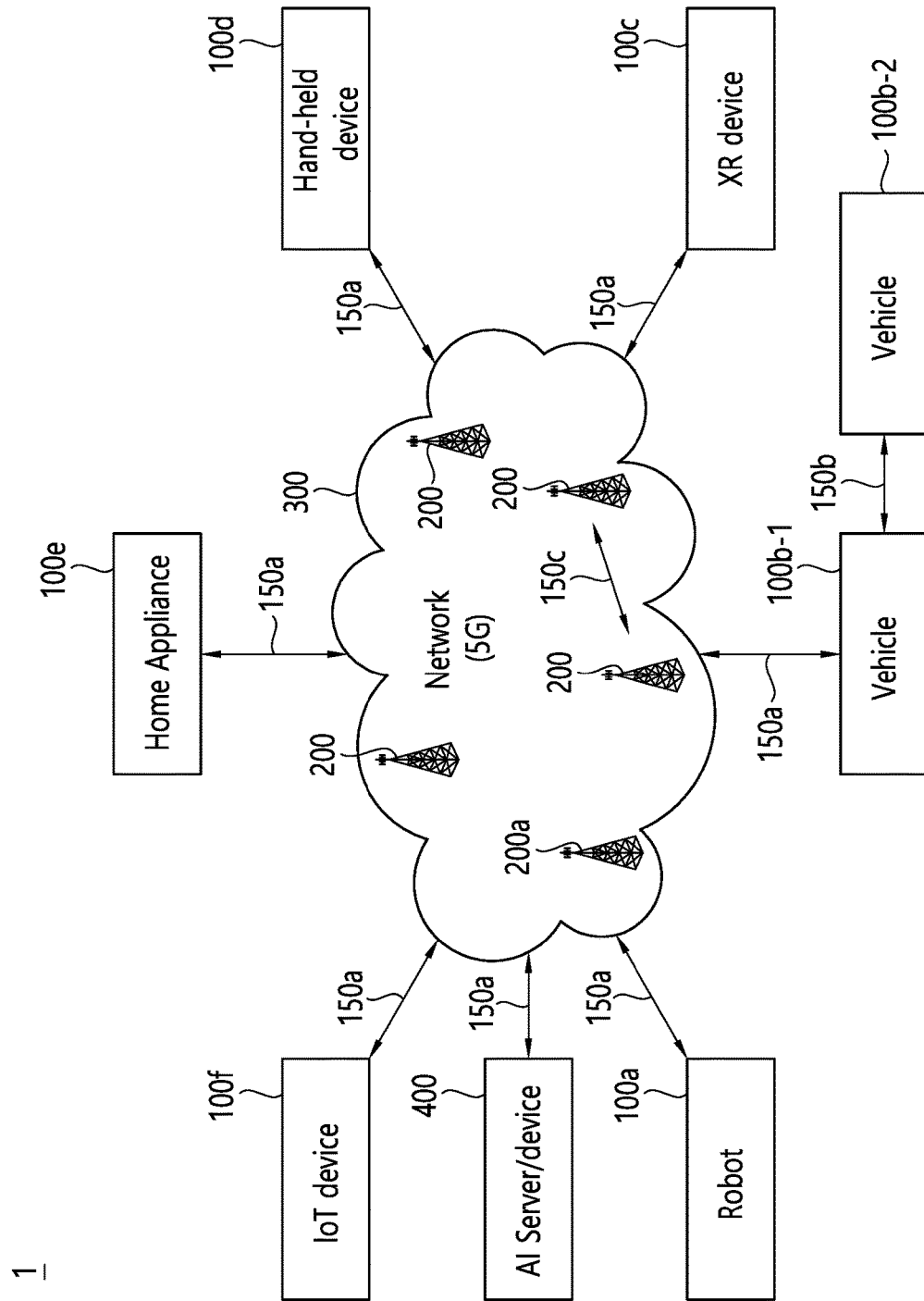
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
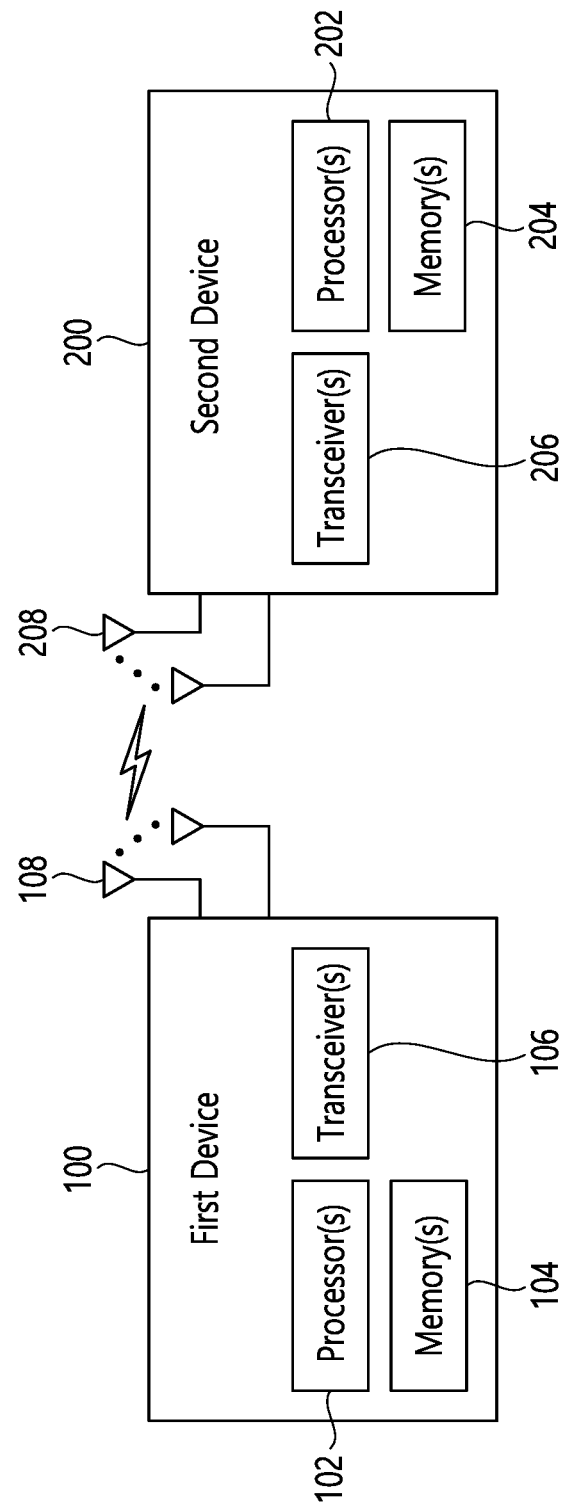
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory (s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands The one or more memories 104 and 204 may be connected to the one or more processors 102 and 202 and store various types of data, signals, messages, information, programs, code, instructions, and/or commands The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
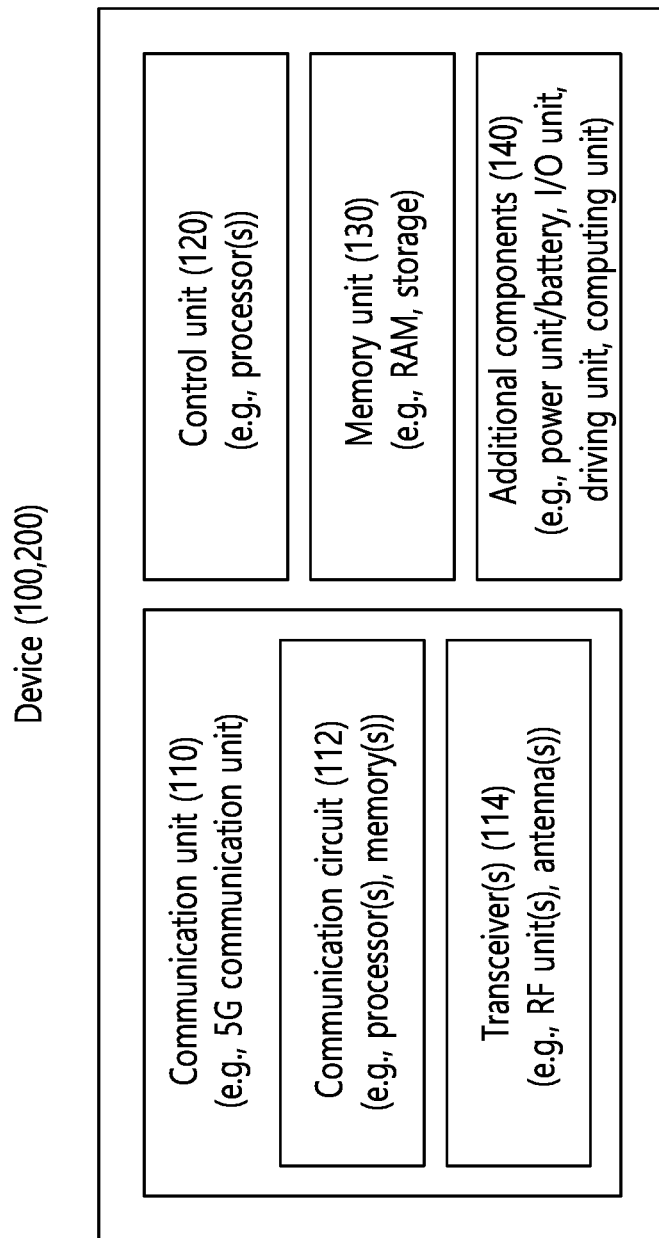
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
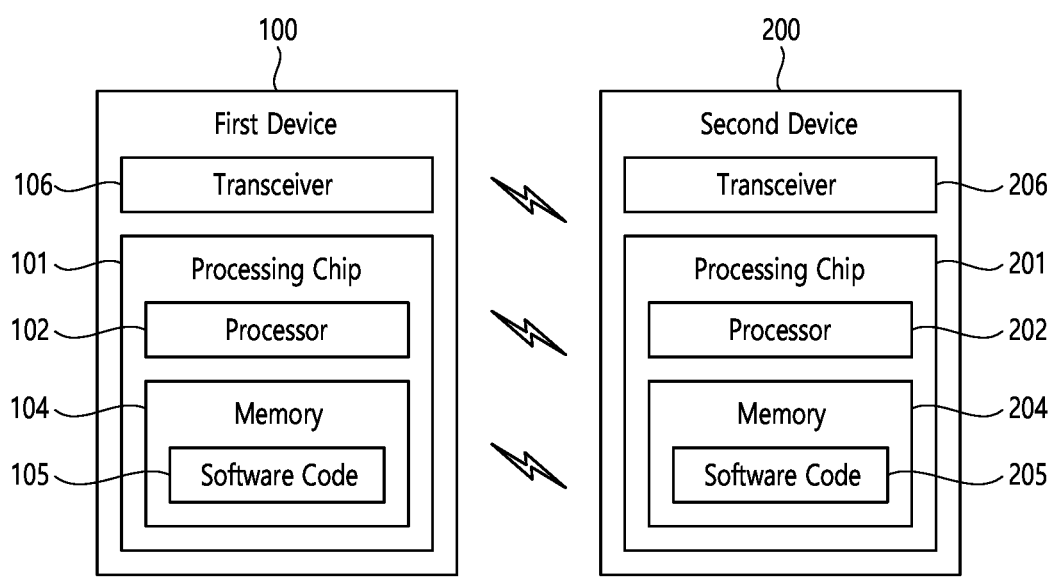
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
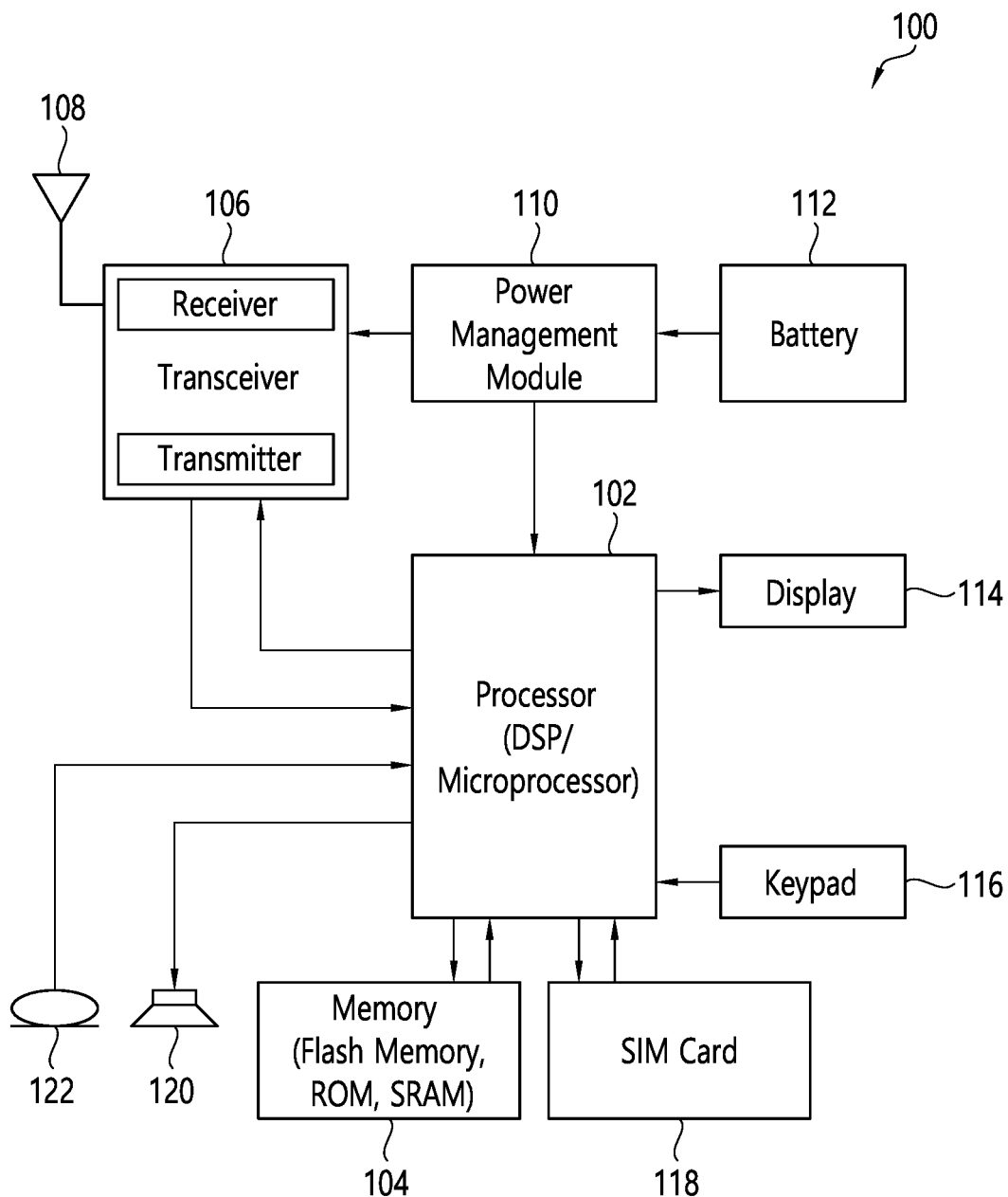
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
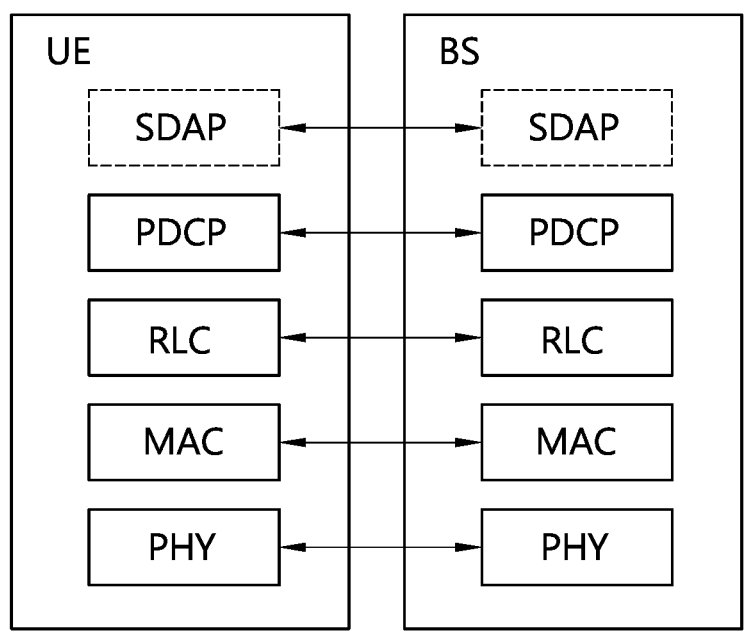
FIGS. 6 and 7 show an example of protocol stacks in a 3GPP based wireless communication system to which implementations of the present disclosure is applied.
Figure 7:
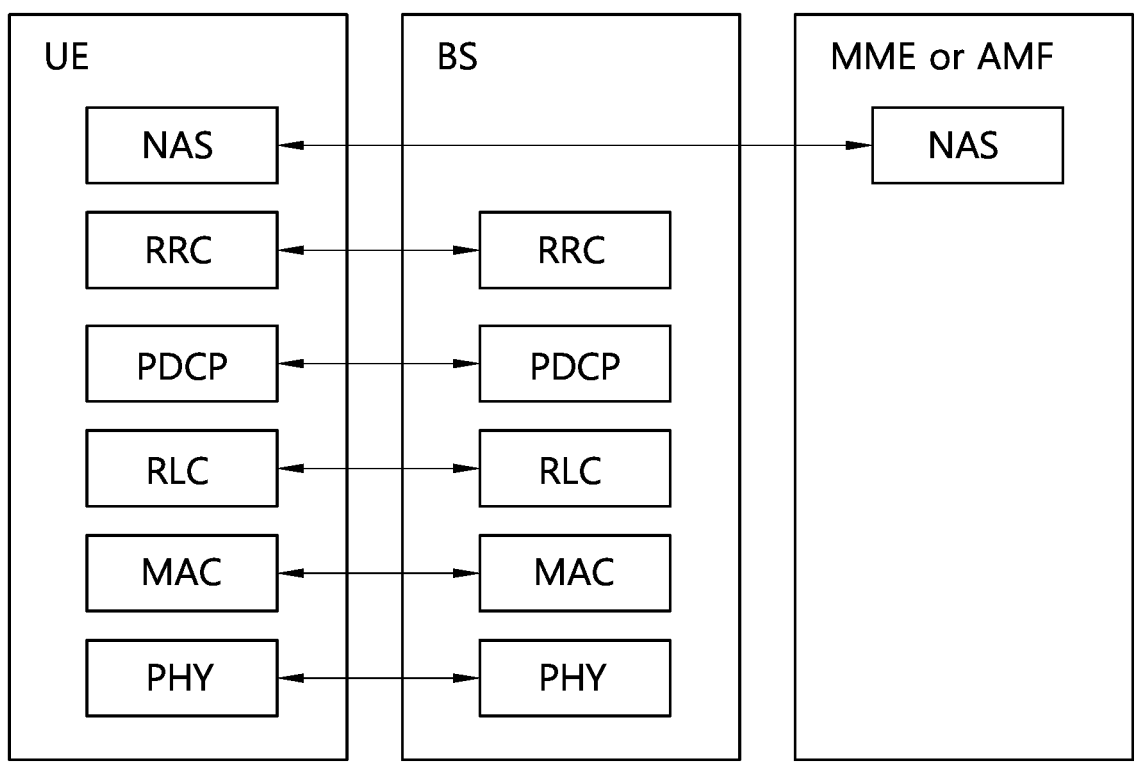

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
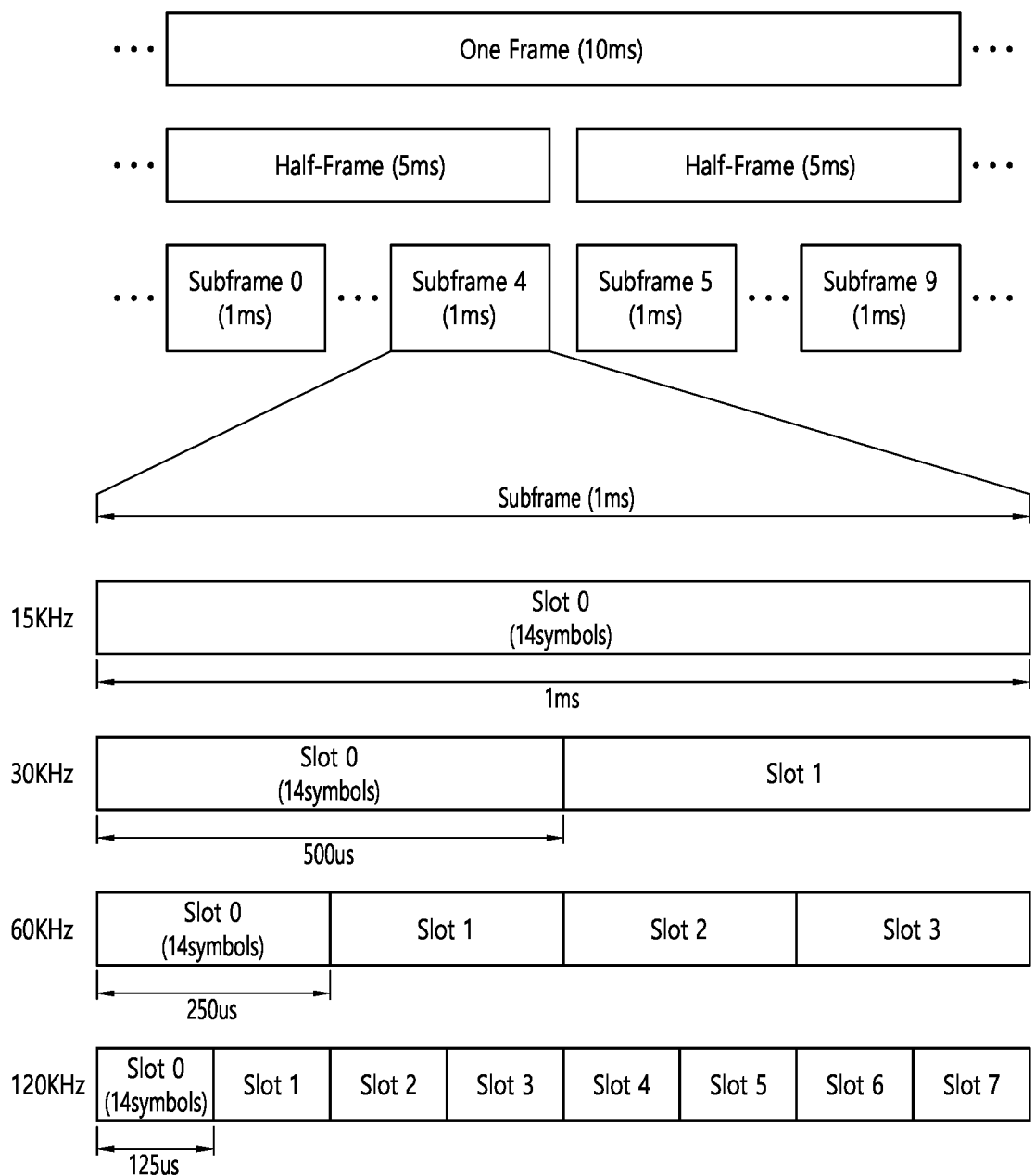
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$ and the number of slots per subframe $N^{subframe,u}_{slot}$ for the extended CP, according to the subcarrier spacing $\Delta f = 2^u \ast 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} \ast N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i} - 1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1' | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
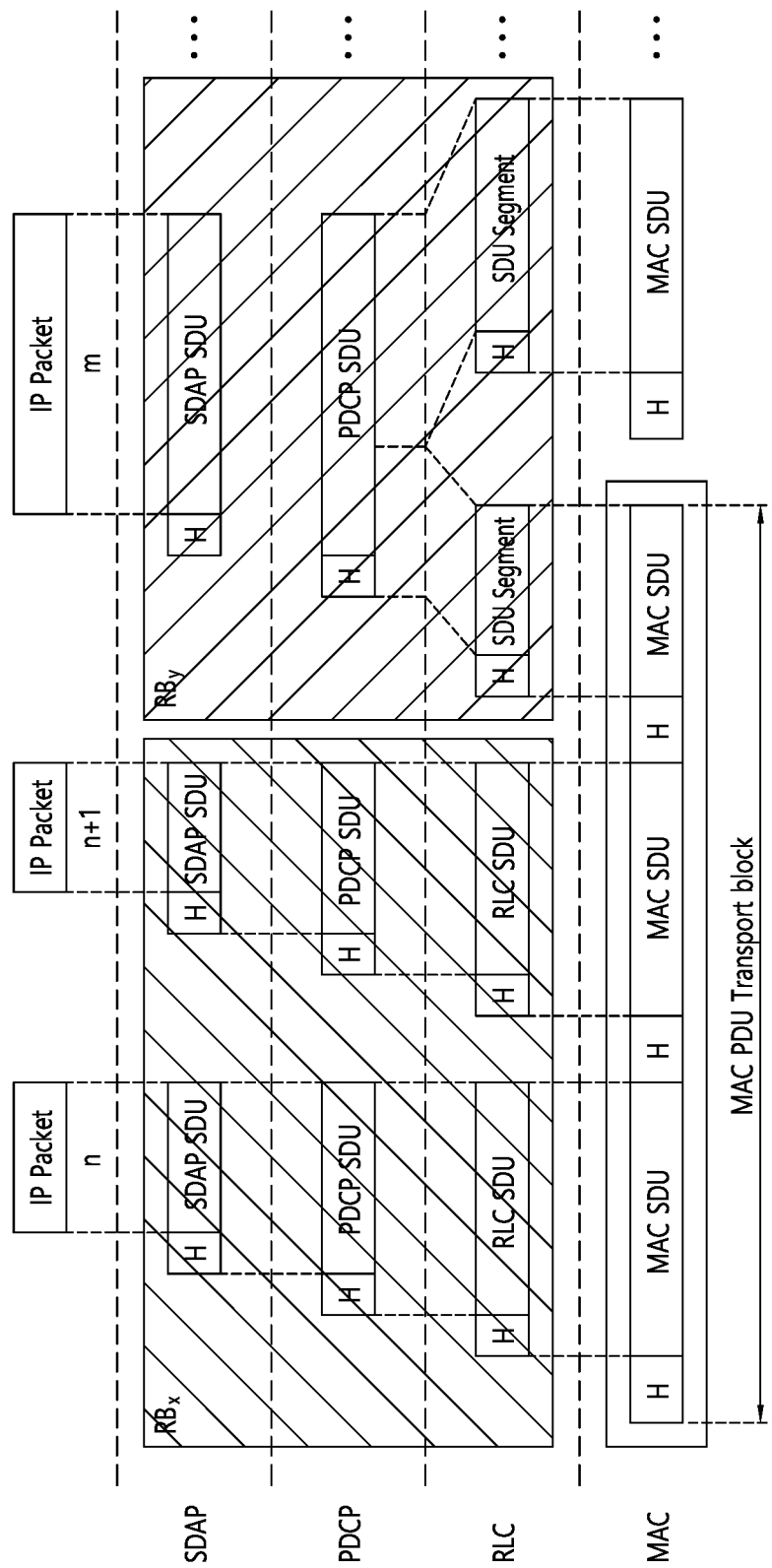
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
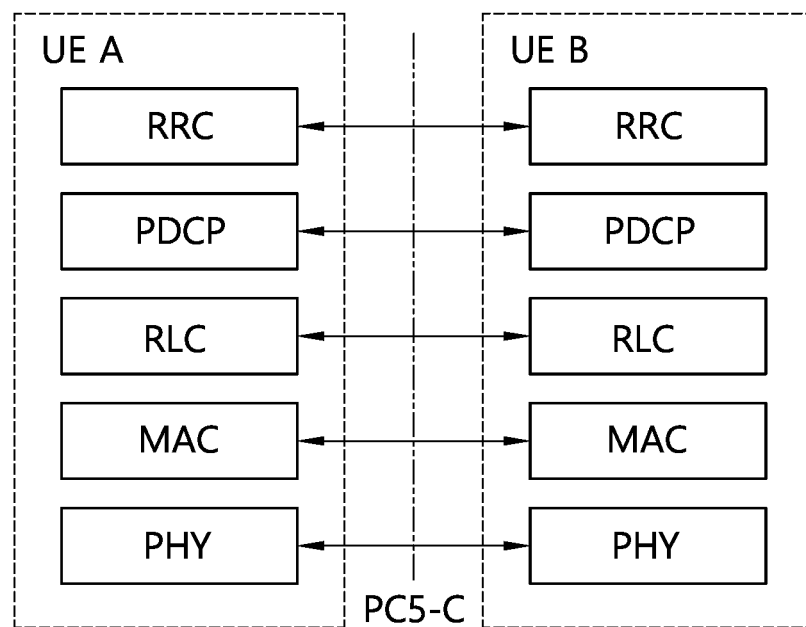
FIGS. 10 and 11 show an example of PC5 protocol stacks to which implementations of the present disclosure is applied.
Figure 11:
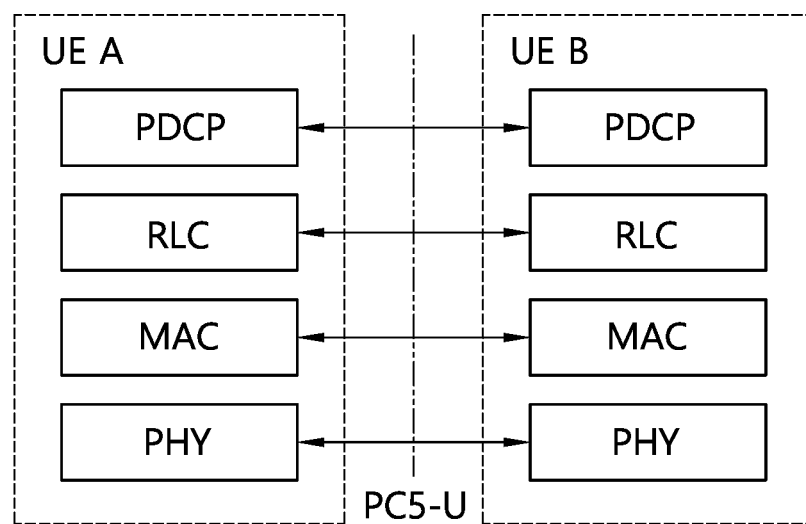

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:

The layer-1 destination ID, conveyed via physical sidelink control channel (PSCCH)

Additional layer-1 ID(s), conveyed via PSCCH, at least for the purpose of identifying which transmissions can be combined in reception when HARQ feedback is in use HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:

Unicast: destination ID, source ID

Groupcast: destination group ID, source ID

Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:
    a) UE autonomously selects SL resource for transmission
    b) UE assists SL resource selection for other UE(s)
    c) UE is configured with NR configured grant (Type-1 like) for SL transmission
    d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:
Decoding of SL control channel transmissions
SL measurements
Detection of SL transmissions The following aspects may be considered for SL resource selection:
How a UE selects resource for PSCCH and physical sidelink shared channel (PSSCH) transmission (and other SL physical channel/signals that are defined)
Which information is used by UE for resource selection procedure Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:
Scheduling UE is configured by gNB
Application layer or pre-configuration selects scheduling UE
Receiver UE schedules transmissions of the transmitter UE during the session
Scheduling UE is decided by multiple UEs including the one that is finally selected.

The UE may autonomously decide to serve as a scheduling UE/offer scheduling UE functions (i.e., by self-nomination).

In order to transmit data unit(s) of the present disclosure on UL-SCH, a UE shall have uplink resources available to the UE. In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a random access response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the cell radio network temporary identifier (C-RNTI) on PDCCH(s). A UE always monitors the PDCCH(s) in order to find possible grants for uplink transmission when its downlink reception is enabled (activity governed by discontinuous reception (DRX) when configured). In addition, with configured grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to configured scheduling RNTI (CS-RNTI) can either signal and activate the configured uplink grant, or deactivate it. That is, a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with semi-persistent Scheduling (SPS), the BS can allocate downlink resources for the initial HARQ transmissions to UEs. RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

For resource allocation by PDCCH (i.e., resource allocation by DCI), PDCCH can be used to schedule DL transmissions on PDSCH and UL transmissions on PUSCH, where the DCI on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Figure 12:
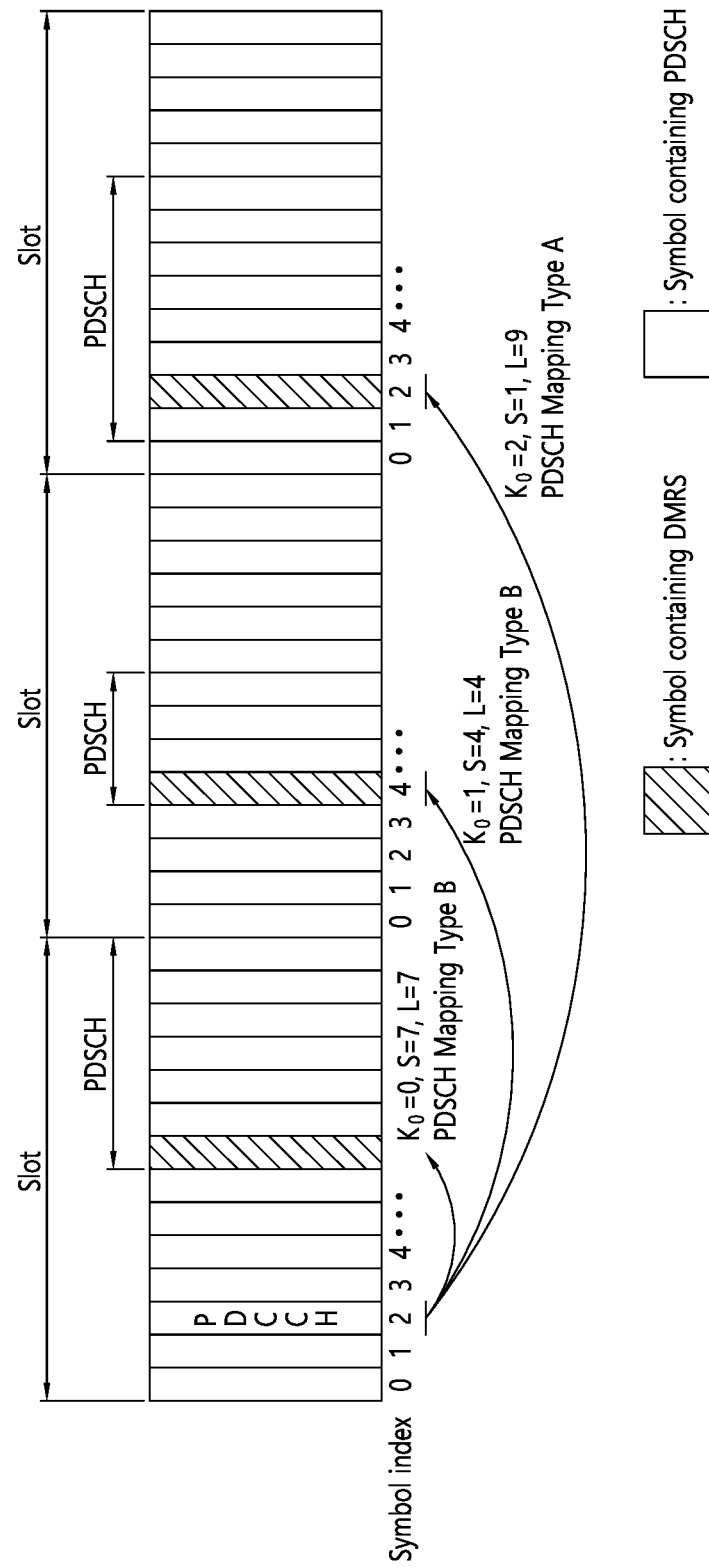
FIG. 12 shows an example of PDSCH time domain resource allocation by PDCCH to which implementations of the present disclosure is applied.
Figure 13:
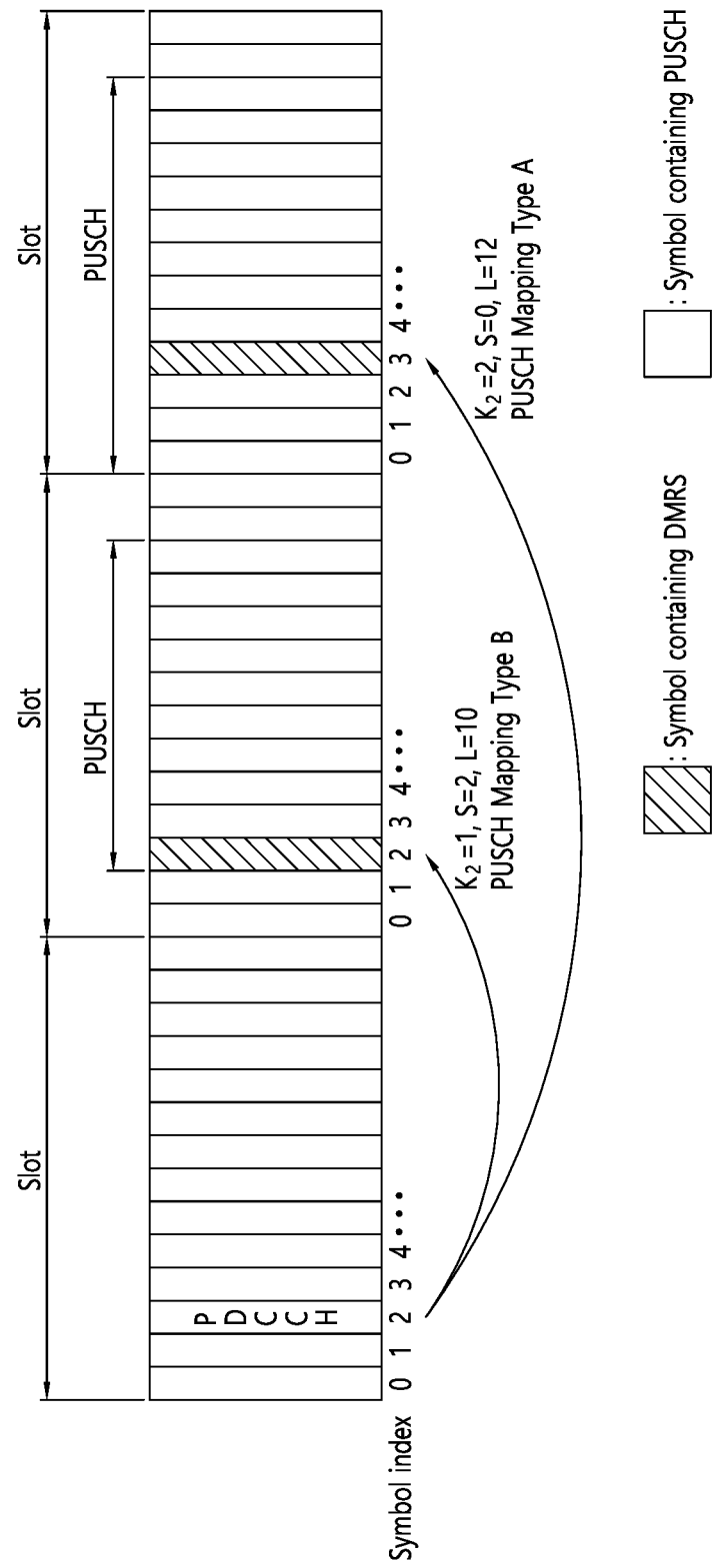
FIG. 13 shows an example of PUSCH time resource allocation by PDCCH to which implementations of the present disclosure is applied.

FIG. 12 shows an example of PDSCH time domain resource allocation by PDCCH to which implementations of the present disclosure is applied. FIG. 13 shows an example of PUSCH time resource allocation by PDCCH to which implementations of the present disclosure is applied.

DCI carried by a PDCCH for scheduling PDSCH or PUSCH includes a value m for a row index m+1 to an allocation table for PDSCH or PUSCH. Either a predefined default PDSCH time domain allocation A, B or C is applied as the allocation table for PDSCH, or RRC configured pdsch-TimeDomainAllocationList is applied as the allocation table for PDSCH. Either a predefined default PUSCH time domain allocation A is applied as the allocation table for PUSCH, or the RRC configured pusch-TimeDomainAllocationList is applied as the allocation table for PUSCH. Which PDSCH time domain resource allocation configuration to apply and which PUSCH time domain resource allocation table to apply are determined according to a fixed/predefined rule.

Each indexed row in PDSCH time domain allocation configurations defines the slot offset $K_0$, the start and length indicator SLIV, or directly the start symbol S and the allocation length L, and the PDSCH mapping type to be assumed in the PDSCH reception. Each indexed row in PUSCH time domain allocation configurations defines the slot offset $K_2$, the start and length indicator SLIV, or directly the start symbol S and the allocation length L, and the PUSCH mapping type to be assumed in the PUSCH reception. $K_0$ for PDSCH, or $K_2$ for PUSCH is the timing difference between a slot with a PDCCH and a slot with PDSCH or PUSCH corresponding to the PDCCH. SLIV is a joint indication of starting symbol S relative to the start of the slot with PDSCH or PUSCH, and the number L of consecutive symbols counting from the symbol S. For PDSCH/PUSCH mapping type, there are two mapping types: one is Mapping Type A where demodulation reference signal (DMRS) is positioned in $3^{rd}$ or $4^{th}$ symbol of a slot depending on the RRC signaling, and other one is Mapping Type B where DMRS is positioned in the first allocated symbol.

The scheduling DCI includes the Frequency domain resource assignment field which provides assignment information on resource blocks used for PDSCH or PUSCH. For example, the Frequency domain resource assignment field may provide a UE with information on a cell for PDSCH or PUSCH transmission, information on a bandwidth part for PDSCH or PUSCH transmission, information on resource blocks for PDSCH or PUSCH transmission.

For resource allocation by RRC, as mentioned above, in uplink, there are two types of transmission without dynamic grant: configured grant Type 1 where an uplink grant is provided by RRC, and stored as configured grant; and configured grant Type 2 where an uplink grant is provided by PDCCH, and stored or cleared as configured uplink grant based on L1 signaling indicating configured uplink grant activation or deactivation. Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

A UE is provided with at least the following parameters via RRC signaling from a BS when the configured grant type 1 is configured:
 cs-RNTI which is CS-RNTI for retransmission;
 periodicity which provides periodicity of the configured grant Type 1; timeDomainOffset which represents offset of a resource with respect to SFN=0 in time domain;
 timeDomainAllocation value m which provides a row index m+1 pointing to an allocation table, indicating a combination of a start symbol S and length L and PUSCH mapping type;
 frequencyDomainAllocation which provides frequency domain resource allocation; and
 mcsAndTBS which provides $I_{MCS}$ representing the modulation order, target code rate and transport block size.
 Upon configuration of a configured grant Type 1 for a serving cell by RRC, the UE stores the uplink grant provided by RRC as a configured uplink grant for the indicated serving cell, and initialize or re-initialise the configured uplink grant to start in the symbol according to timeDomainOffset and S (derived from SLIV), and to reoccur with periodicity. After an uplink grant is configured for a configured grant Type 1, the UE considers that the uplink grant recurs associated with each symbol for which:
 [(SFN*numberOfSlotsPerFrame (numberOfSymbolsPerSlot)+(slot number in the frame X numberOfSymbolsPerSlot)+symbol number in the slot]= (timeDomainOffset*numberOfSymbolsPerSlot+S+ N*periodicity) modulo (1024*numberOfSlotsPerFrame*numberOfSymbolsPerSlot), for all N>=0.

A UE is provided with at least the following parameters via RRC signaling from a BS when the configured gran Type 2 is configured:
 cs-RNTI which is CS-RNTI for activation, deactivation, and retransmission; and
 periodicity which provides periodicity of the configured grant Type 2. The actual uplink grant is provided to the UE by the PDCCH (addressed to CS-RNTI). After an uplink grant is configured for a configured grant Type 2, the UE considers that the uplink grant recurs associated with each symbol for which:
 [(SFN*numberOfSlotsPerFrame*numberOfSymbolsPerSlot)+(slot number in the frame*numberOfSymbolsPerSlot)+symbol number in the slot]= [(SFN$_{start\ time}$*numberOfSlotsPerFrame*numberOfSymbolsPerSlot+slot$_{start\ time}$*numberOfSymbolsPerSlot+symbol$_{start\ time}$)+N*periodicity] modulo (1024×numberOfSlotsPerFrame*numberOfSymbolsPerSlot), for all N>=0, where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised. numberOfSlotsPerFrame and numberOfSymbolsPerSlot refer to the number of consecutive slots per frame and the number of consecutive OFDM symbols per slot, respectively.

For downlink, a UE may be configured with SPS per serving cell and per BWP by RRC signaling from a BS. Multiple configurations can be active simultaneously only on different serving cells. Activation and deactivation of the DL SPS are independent among the serving cells. For DL SPS, a DL assignment is provided to the UE by PDCCH, and stored or cleared based on L1 signaling indicating SPS activation or deactivation. A UE is provided with the following parameters via RRC signaling from a BS when SPS is configured:
 cs-RNTI which is CS-RNTI for activation, deactivation, and retransmission;
 nrofHARQ-Processes: which provides the number of configured HARQ processes for SPS;
 periodicity which provides periodicity of configured downlink assignment for SPS. When SPS is released by upper layers, all the corresponding configurations shall be released.

After a downlink assignment is configured for SPS, the UE considers sequentially that the $N^{th}$ downlink assignment occurs in the slot for which:
 (numberOfSlotsPerFrame*SFN+slot number in the frame)=[(numberOfSlotsPerFrame*SFN$_{start\ time}$+slot$_{start\ time}$)+N*periodicity*numberOfSlotsPerFrame/10] modulo (1024*numberOfSlotsPerFrame), where SFN$_{start\ time}$ and slot$_{start\ time}$ are the SFN and slot, respectively, of the first transmission of PDSCH where the configured downlink assignment was (re-)initialized.

A UE validates, for scheduling activation or scheduling release, a DL SPS assignment PDCCH or configured UL grant type 2 PDCCH if the cyclic redundancy check (CRC) of a corresponding DCI format is scrambled with CS-RNTI provided by the RRC parameter cs-RNTI and the new data indicator field for the enabled transport block is set to 0. Validation of the DCI format is achieved if all fields for the DCI format are set according to Table 5 or Table 6 below. Table 5 shows special fields for DL SPS and UL grant Type 2 scheduling activation PDCCH validation, and Table 6 shows special fields for DL SPS and UL grant Type 2 scheduling release PDCCH validation.

TABLE 5

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 6

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and actual UL grant, and the corresponding modulation and coding scheme are provided by the resource assignment fields (e.g., time domain resource assignment field which provides Time domain resource assignment value m, frequency domain resource assignment field which provides the frequency resource block allocation, modulation and coding scheme field) in the DCI format carried by the DL SPS and UL grant Type 2 scheduling activation PDCCH. If validation is achieved, the UE considers the information in the DCI format as valid activation or valid release of DL SPS or configured UL grant Type 2.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g., PDSCH, PUSCH) based on the resource allocation (e.g., UL grant, DL assignment) provided to the UE as disclosed above.

HARQ operation and HARQ process is described. Section 5.4.2 of 3GPP TS 38.321 V15.4.0 (2018-12) can be referred.

The MAC entity includes a HARQ entity for each serving cell with configured uplink (including the case when it is configured with supplementaryUplink), which maintains a number of parallel HARQ processes.

Each HARQ process supports one TB.

Each HARQ process is associated with a HARQ process identifier. For UL transmission with UL grant in random access (RA) response, HARQ process identifier 0 is used.

When the MAC entity is configured with pusch-AggregationFactor>1, the parameter pusch-AggregationFactor provides the number of transmissions of a TB within a bundle of the dynamic grant. After the initial transmission, pusch-AggregationFactor−1 HARQ retransmissions follow within a bundle. When the MAC entity is configured with repK>1, the parameter repK provides the number of transmissions of a TB within a bundle of the configured uplink grant. After the initial transmission, HARQ retransmissions follow within a bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to pusch-AggregationFactor for a dynamic grant and repK for a configured uplink grant, respectively. Each transmission within a bundle is a separate uplink grant after the initial uplink grant within a bundle is delivered to the HARQ entity.

For each uplink grant, the HARQ entity shall:

1> identify the HARQ process associated with this grant, and for each identified HARQ process:

2> if the received grant was not addressed to a temporary C-RNTI on PDCCH, and the new data indicator (NDI) provided in the associated HARQ information has been toggled compared to the value in the previous transmission of this TB of this HARQ process; or 2> if the uplink grant was received on PDCCH for the C-RNTI and the HARQ buffer of the identified process is empty; or 2> if the uplink grant was received in a random access response; or 2> if the uplink grant was received on PDCCH for the C-RNTI in ra-Response Window and this PDCCH successfully completed the random access procedure initiated for beam failure recovery; or 2> if the uplink grant is part of a bundle of the configured uplink grant, and may be used for initial transmission, and if no MAC PDU has been obtained for this bundle:

3> if there is a MAC PDU in the Msg3 buffer and the uplink grant was received in a Random Access Response; or:

3> if there is a MAC PDU in the Msg3 buffer and the uplink grant was received on PDCCH for the C-RNTI in ra-Response Window and this PDCCH successfully completed the Random Access procedure initiated for beam failure recovery:

4> obtain the MAC PDU to transmit from the Msg3 buffer.

4> if the uplink grant size does not match with size of the obtained MAC PDU; and 4> if the random access procedure was successfully completed upon receiving the uplink grant:

5> indicate to the multiplexing and assembly entity to include MAC subPDU(s) carrying MAC SDU from the obtained MAC PDU in the subsequent uplink transmission;

5> obtain the MAC PDU to transmit from the Multiplexing and assembly entity.

3> else:

4> obtain the MAC PDU to transmit from the Multiplexing and assembly entity, if any;

3> if a MAC PDU to transmit has been obtained:

4> deliver the MAC PDU and the uplink grant and the HARQ information of the TB to the identified HARQ process;

4> instruct the identified HARQ process to trigger a new transmission;

4> if the uplink grant is addressed to CS-RNTI; or

4> if the uplink grant is a configured uplink grant; or

4> if the uplink grant is addressed to C-RNTI, and the identified HARQ process is configured for a configured uplink grant:
  5> start or restart the configuredGrantTimer, if configured, for the corresponding HARQ process when the transmission is performed.
3> else:
  4> flush the HARQ buffer of the identified HARQ process.
2> else (i.e., retransmission):
  3> if the uplink grant received on PDCCH was addressed to CS-RNTI and if the HARQ buffer of the identified process is empty; or
  3> if the uplink grant is part of a bundle and if no MAC PDU has been obtained for this bundle; or
  3> if the uplink grant is part of a bundle of the configured uplink grant, and the PUSCH of the uplink grant overlaps with a PUSCH of another uplink grant received on the PDCCH or in a random access response for this serving cell:
    4> ignore the uplink grant.
  3> else:
    4> deliver the uplink grant and the HARQ information (redundancy version) of the TB to the identified HARQ process;
    4> instruct the identified HARQ process to trigger a retransmission;
    4> if the uplink grant is addressed to CS-RNTI; or
    4> if the uplink grant is addressed to C-RNTI, and the identified HARQ process is configured for a configured uplink grant:
      5> start or restart the configuredGrantTimer, if configured, for the corresponding HARQ process when the transmission is performed.

When determining if NDI has been toggled compared to the value in the previous transmission, the MAC entity shall ignore NDI received in all uplink grants on PDCCH for its Temporary C-RNTI.

Each HARQ process is associated with a HARQ buffer.

New transmissions are performed on the resource and with the MCS indicated on either PDCCH, random access response, or RRC. Retransmissions are performed on the resource and, if provided, with the MCS indicated on PDCCH, or on the same resource and with the same MCS as was used for last made transmission attempt within a bundle.

If the HARQ entity requests a new transmission for a TB, the HARQ process shall:
  1> store the MAC PDU in the associated HARQ buffer;
  1> store the uplink grant received from the HARQ entity;
  1> generate a transmission as described below.

If the HARQ entity requests a retransmission for a TB, the HARQ process shall:
  1> store the uplink grant received from the HARQ entity;
  1> generate a transmission as described below.

To generate a transmission for a TB, the HARQ process shall:
  1> if the MAC PDU was obtained from the Msg3 buffer; or
  1> if there is no measurement gap at the time of the transmission and, in case of retransmission, the retransmission does not collide with a transmission for a MAC PDU obtained from the Msg3 buffer:
    2> instruct the physical layer to generate a transmission according to the stored uplink grant.

Logical channel prioritization (LCP) is described. Section 5.4.3.1 of 3GPP TS 38.321 V15.4.0 (2018-12) can be referred.

The LCP procedure is applied whenever a new transmission is performed.

RRC controls the scheduling of uplink data by signaling for each logical channel per MAC entity:
  priority where an increasing priority value indicates a lower priority level;
  prioritisedBitRate which sets the prioritized bit rate (PBR);
  bucketSizeDuration which sets the bucket size duration (BSD).

RRC additionally controls the LCP procedure by configuring mapping restrictions for each logical channel:
  allowedSCS-List which sets the allowed Subcarrier Spacing(s) for transmission;
  maxPUSCH-Duration which sets the maximum PUSCH duration allowed for transmission;
  configuredGrantType1Allowed which sets whether a configured grant Type 1 can be used for transmission;
  allowedServingCells which sets the allowed cell(s) for transmission.

The following UE variable is used for the Logical channel prioritization procedure:
  Bj which is maintained for each logical channel j.

The MAC entity shall initialize Bj of the logical channel to zero when the logical channel is established.

For each logical channel j, the MAC entity shall:
  1> increment Bj by the product PBR X T before every instance of the LCP procedure, where T is the time elapsed since Bj was last incremented;
  1> if the value of Bj is greater than the bucket size (i.e. PBR X BSD):
    2> set Bj to the bucket size.

The MAC entity shall, when a new transmission is performed:
  1> select the logical channels for each UL grant that satisfy all the following conditions:
    2> the set of allowed Subcarrier Spacing index values in allowedSCS-List, if configured, includes the Subcarrier Spacing index associated to the UL grant; and
    2> maxPUSCH-Duration, if configured, is larger than or equal to the PUSCH transmission duration associated to the UL grant; and
    2> configuredGrantType1Allowed, if configured, is set to true in case the UL grant is a Configured Grant Type 1; and
    2> allowedServingCells, if configured, includes the Cell information associated to the UL grant. Does not apply to logical channels associated with a DRB configured with PDCP duplication within the same MAC entity (i.e., carrier aggregation (CA) duplication) for which PDCP duplication is deactivated.

The subcarrier spacing index, PUSCH transmission duration and cell information are included in uplink transmission information received from lower layers for the corresponding scheduled uplink transmission.

The MAC entity shall, when a new transmission is performed:
  1> allocate resources to the logical channels as follows:
    2> logical channels selected for the UL grant with Bj> 0 are allocated resources in a decreasing priority order. If the PBR of a logical channel is set to "infinity", the MAC entity shall allocate resources for all the data that is available for transmission on the logical channel before meeting the PBR of the lower priority logical channel(s);
    2> decrement Bj by the total size of MAC SDUs served to logical channel j above;
    2> if any resources remain, all the logical channels are served in a strict decreasing priority order (regardless of the value of Bj) until either the data for that logical channel or the UL grant is exhausted, whichever comes first. Logical channels configured with equal priority should be served equally.

The value of Bj can be negative.

The UE shall also follow the rules below during the scheduling procedures above:
  the UE should not segment an RLC SDU (or partially transmitted SDU or retransmitted RLC PDU) if the whole SDU (or partially transmitted SDU or retransmitted RLC PDU) fits into the remaining resources of the associated MAC entity;
  if the UE segments an RLC SDU from the logical channel, it shall maximize the size of the segment to fill the grant of the associated MAC entity as much as possible;
  the UE should maximize the transmission of data;
  if the MAC entity is given a UL grant size that is equal to or larger than 8 bytes while having data available and allowed for transmission, the MAC entity shall not transmit only padding buffer status report (BSR) and/or padding.

The MAC entity shall not generate a MAC PDU for the HARQ entity if the following conditions are satisfied:
  the MAC entity is configured with skipUplinkTxDynamic and the grant indicated to the HARQ entity was addressed to a C-RNTI, or the grant indicated to the HARQ entity is a configured uplink grant; and
  there is no aperiodic channel state information (CSI) requested for this PUSCH transmission; and
  the MAC PDU includes zero MAC SDUs; and
  the MAC PDU includes only the periodic BSR and there is no data available for any logical channel group (LCG), or the MAC PDU includes only the padding BSR.

Logical channels shall be prioritized in accordance with the following order (highest priority listed first):
  C-RNTI MAC control element (CE) or data from UL-CCCH;
  Configured grant confirmation MAC CE;
  MAC CE for BSR, with exception of BSR included for padding;
  Single entry power headroom reporting (PHR) MAC CE or multiple entry PHR MAC CE;
  data from any logical Channel, except data from UL-CCCH;
  MAC CE for recommended bit rate query;
  MAC CE for BSR included for padding.

PDCP duplication is described. Section 5.11 of 3GPP TS 38.323 V15.4.0 (2018-12) can be referred.

For the PDCP entity configured with pdcp-Duplication, the transmitting PDCP entity shall:
  1> for SRBs:
  2> activate the PDCP duplication;
  1> for DRBs:
  2> if the activation of PDCP duplication is indicated:
  3> activate the PDCP duplication;
  2> if the deactivation of PDCP duplication is indicated:
  3> deactivate the PDCP duplication.

For the PDCP entity configured with pdcp-Duplication, the transmitting PDCP entity shall:
  1> if the successful delivery of a PDCP data PDU is confirmed by one of the two associated AM RLC entities:
    2> indicate to the other AM RLC entity to discard the duplicated PDCP data PDU;
  1> if the deactivation of PDCP duplication is indicated:
    2> indicate to the secondary RLC entity to discard all duplicated PDCP data PDUs.

If UE MAC does not successfully transmit a MAC PDU, e.g., after reaching the maximum number of HARQ retransmissions, UE RLC performs retransmission of a data unit included in the MAC PDU to provide reliable delivery of the data unit. However, if transmission of the data unit requires high reliability and low latency, e.g., for URLLC service and/or V2X service, RLC level retransmission in RLC AM mode will take some time because UE should acquire new UL grant needed for retransmitting the data unit.

In addition, if transmission of a data unit requires high reliability, UE PDCP may duplicate the data unit and then transmit the duplicated data units into two RLC entities to perform separate transmissions of the duplicated data units on different cells and/or carriers. This mechanism increases reliability in transmission. But, it will always consume radio resources, which would be problematic in congestion situations.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 14:
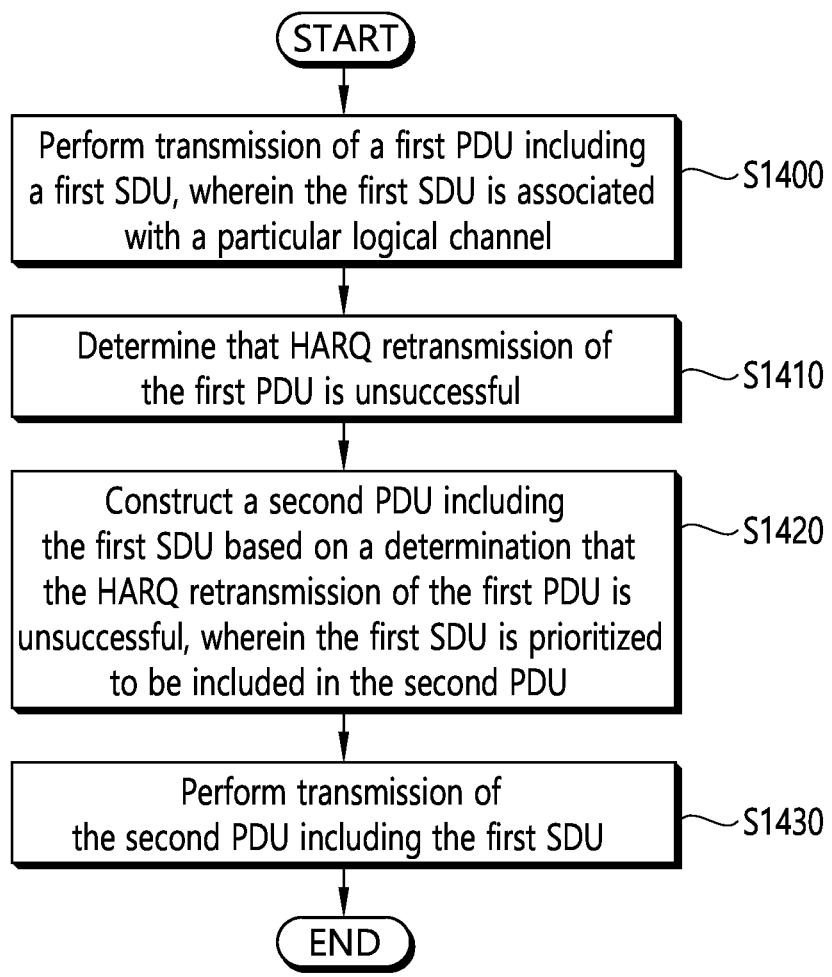
FIG. 14 shows an example of a method for a wireless device according to implementations of the present disclosure.

FIG. 14 shows an example of a method for a wireless device according to implementations of the present disclosure.

The wireless device may be in communication with at least one of a mobile device, a network, and/or autonomous vehicles other than the wireless device.

In step S1400, the wireless device performs transmission of a first PDU including a SDU. The first SDU is associated with a particular logical channel In some implementations, the particular logical channel may be indicated by a network. In some implementations, the particular logical channel may have a higher priority than a threshold indicated by a network. In some implementations, the particular logical channel may have a highest priority among multiple logical channels.

In some implementations, the first MAC SDU may have a higher priority than a threshold indicated by a network. In some implementations, the first MAC SDU may have a highest priority among multiple MAC SDUs.

In some implementations, the transmission of the first PDU and the HARQ retransmission of the first PDU may be associated with a first HARQ process. The transmission of the first PDU and the HARQ retransmission of the first PDU may be performed based on a first grant. The first grant is an uplink grant or a sidelink grant.

In step S1410, the wireless device determines that a hybrid automatic repeat request (HARQ) retransmission of the first PDU is unsuccessful.

In some implementations, the HARQ retransmission of the first PDU may be determined to be unsuccessful based on reaching a number of maximum retransmissions of the first MAC PDU without a positive acknowledgement. That is, the HARQ retransmission of the first PDU may be determined to be unsuccessful when a number of maximum retransmissions of the first MAC PDU has reached without a positive acknowledgement.

In some implementations, the HARQ retransmission of the first PDU may be determined to be unsuccessful based on expiry of a timer associated with the first MAC PDU without a positive acknowledgement. That is, the HARQ retransmission of the first PDU may be determined to be unsuccessful when the timer associated with the first MAC PDU expires without a positive acknowledgement. The timer associated with the first MAC PDU may start upon performing an initial transmission of the first MAC PDU.

In step S1420, the wireless device constructs a second PDU including the first SDU based on a determination that the HARQ retransmission of the first PDU is unsuccessful. The first SDU is prioritized to be included in the second PDU.

In some implementations, constructing the second PDU including the first SDU, which is prioritized to be included in the second PDU, may comprise performing LCP to create the second MAC PDU by prioritizing the first MAC SDU.

In some implementations, the second MAC PDU may include other MAC SDUs not included in the first MAC PDU.

In step S1430, the wireless device performs transmission of the second PDU including the first SDU.

In some implementations, the transmission of the second PDU may be associated with a second HARQ process. The transmission of the second PDU may be performed based on a second grant. The second grant may be an uplink grant or a sidelink grant.

Figure 15:
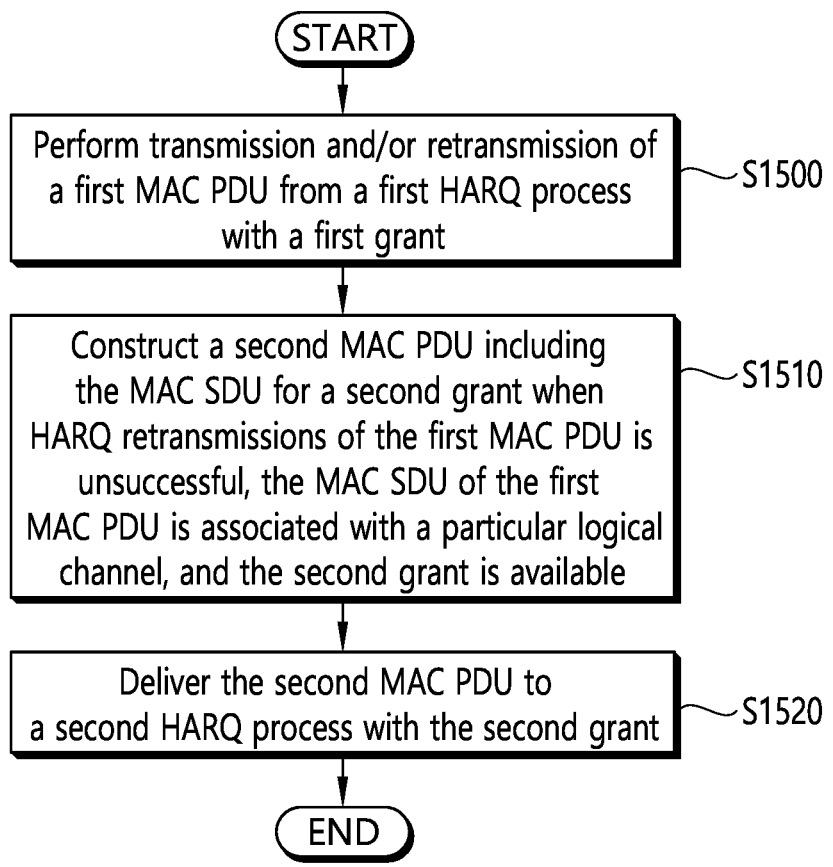
FIG. 15 shows another example of a method for a wireless device according to implementations of the present disclosure.

FIG. 15 shows another example of a method for a wireless device according to implementations of the present disclosure.

In step S1500, the wireless device performs transmission and/or retransmission of a first MAC PDU from the first HARQ process with the first grant.

In some implementations, the first grant may be either an uplink grant or a sidelink grant.

In step S1510, the wireless device constructs a second MAC PDU including the MAC SDU for a second grant when HARQ retransmissions of the first MAC PDU is unsuccessful, the MAC SDU of the first MAC PDU is associated with a particular logical channel, and the second grant is available.

In some implementations, the second grant may be either an uplink grant or a sidelink grant.

In some implementations, the particular logical channel may be indicated by the network. The particular logical channel may have a priority higher than and/or equal to a threshold indicated by the network.

In some implementations, the MAC SDU may have a priority higher than and/or equal to a threshold indicated by the network.

In some implementations, the second MAC PDU may also include other MAC SDUs not contained in the first MAC PDU.

In some implementations, MAC entity of the wireless device may inform the corresponding RLC entity of the wireless device about NACK for the MAC SDU and receive the MAC SDU from the RLC entity of the wireless device.

In some implementations, the wireless device may consider HARQ retransmissions of the first MAC PDU is unsuccessful if one of the following conditions is met:
when the number of maximum retransmissions of the first MAC PDU has reached without positive acknowledgement; or
when a timer associated with the first MAC PDU expires without positive acknowledgement;

The timer associated with the first MAC PDU may start when the wireless device performs initial transmission of the first MAC PDU.

In some implementations, when the wireless device constructs the second MAC PDU, the wireless device may perform LCP to create the second MAC PDU by prioritizing the MAC SDU or initially including the MAC SDU in the second PDU. The wireless device may prioritize the MAC SDU by increasing the logical channel priority of the particular logical channel to, e.g., with the highest priority.

In step S1520, the wireless device the second MAC PDU to the second HARQ process with the second grant.

In some implementations, the first HARQ process may be equal to the second HARQ process.

In some implementations, the wireless device may flush HARQ buffer of the first HARQ process.

In some implementations, the first HARQ process and the second HARQ process may operate on different radio resources (e.g., different BWPs, different cells, different carriers, and/or different resource pools).

Figure 16:
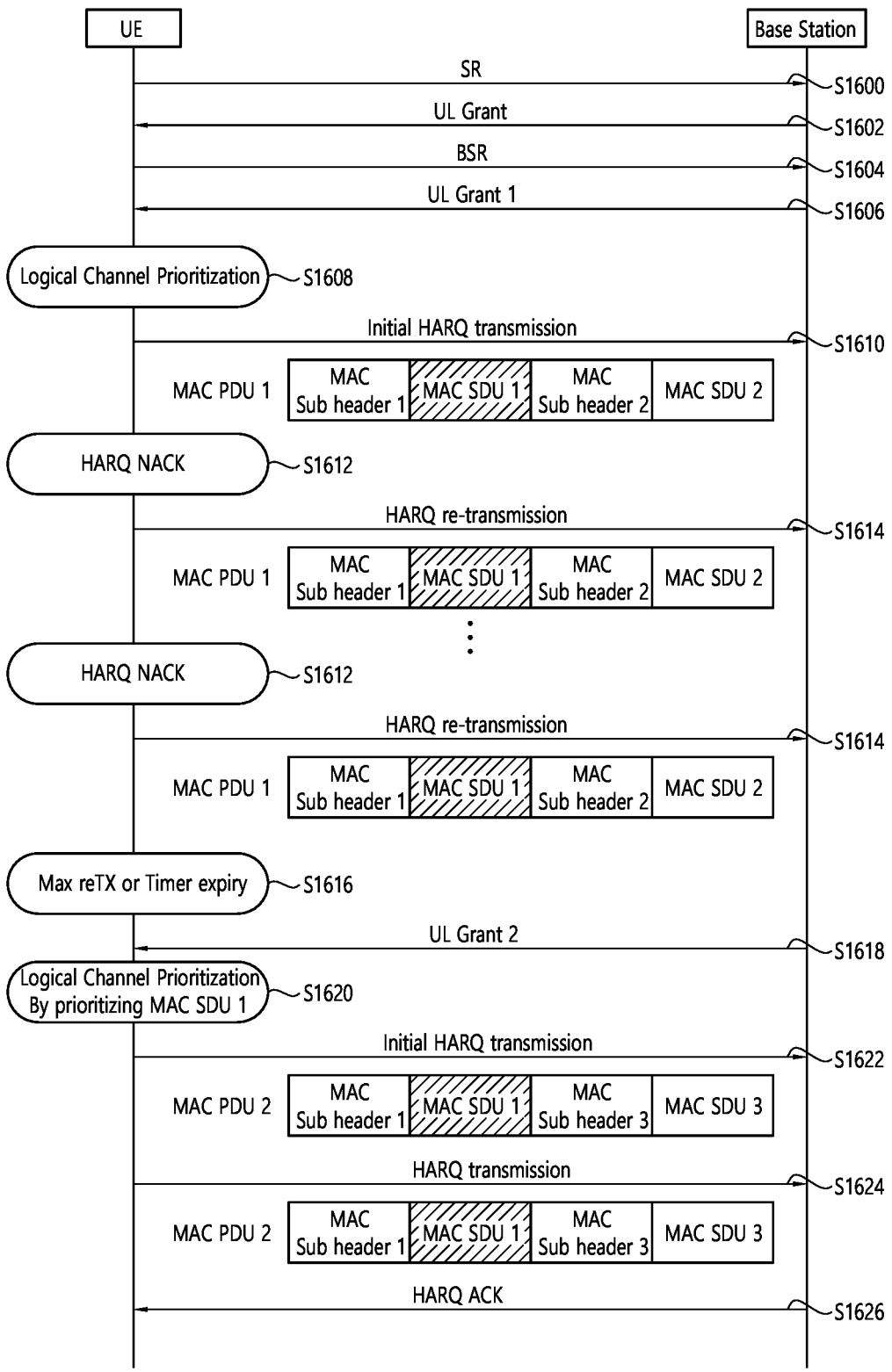
FIG. 16 shows an example of uplink transmission of a MAC SDU according to implementations of the present disclosure.

FIG. 16 shows an example of uplink transmission of a MAC SDU according to implementations of the present disclosure.

In step S1600, the UE may trigger scheduling request (SR) to acquire uplink grant. In step S1602, the UE may receive uplink grant.

In step S1604, the UE may transmit BSR MAC CE by using the received uplink grant to indicate buffer size for one or more logical channels.

In step S1606, upon receiving the BSR MAC CE from the UE, the base station, e.g. gNB, provides the first uplink grant (e.g., UL grant 1).

In step S1608, the UE performs LCP to construct the first MAC PDU based on the first uplink grant. The UE may include one or more MAC SDUs from one or more logical channels into the first MAC PDU. The UE may deliver the first MAC PDU to the first HARQ process with the first uplink grant. At least one MAC SDU of the first MAC PDU may be associated with a particular logical channel.

In some implementations, the particular logical channel may be prioritized, e.g. by the gNB. The particular logical channel may be indicated by a network. In some implementations, the particular logical channel may have a higher priority than a threshold indicated by a network. In some implementations, the particular logical channel may have a highest priority among multiple logical channels.

In some implementations, the first MAC SDU may have a higher priority than a threshold indicated by a network. In some implementations, the first MAC SDU may have a highest priority among multiple MAC SDUs.

In step S1610, the UE performs HARQ transmission. If a HARQ transmission is not positively acknowledged in step S1612, if necessary in step S1614, the UE may perform HARQ retransmissions of the first MAC PDU from the first HARQ process, if a grant is available for this retransmission.

In step S1616, the UE may consider HARQ transmissions of the first MAC PDU is unsuccessful if one of the following conditions is met:
when the number of maximum retransmissions of the first MAC PDU has reached without positive acknowledgement; or
when a timer associated with the first MAC PDU expires without positive acknowledgement The UE may start the timer associated with the first MAC PDU when the UE performs the initial transmission of the first MAC PDU. The timer value may be configured by the gNB.

In step S1618, the UE may receive the second uplink grant (e.g., UL grant 2) from the gNB.

In step S1620, If HARQ transmission and/or retransmissions of the first MAC PDU is unsuccessful, if the MAC SDU included in the first MAC PDU is associated with the prioritized logical channel, and if the second uplink grant is available, the UE constructs a second MAC PDU including the MAC SDU for the second uplink grant. When the UE constructs the second MAC PDU, the UE may perform logical channel prioritization to create the second MAC PDU by prioritizing the MAC SDU or initially including the MAC SDU in the second PDU.

In some implementations, the UE may prioritize the MAC SDU by increasing the logical channel priority of the particular logical channel, e.g., with the highest priority in the LCP procedure.

In some implementations, the second MAC PDU may also include other MAC SDUs (e.g., the third MAC SDU in FIG. 16) not contained in the first MAC PDU.

In some implementations, for this step, UE MAC may inform a UE RLC entity corresponding to the MAC SDU about NACK for the MAC SDU, about retrieval of the MAC SDU and/or about retransmission of the MAC SDU. In this case, the RLC entity may not perform ARQ retransmission of the MAC SDU.

In some implementations, UE MAC may retrieve the MAC SDU from the first HARQ process and/or RLC buffer of the RLC entity.

In some implementations, the UE may deliver the second MAC PDU to the second HARQ process with the second uplink grant.

In some implementations, the first HARQ process may be equal to the second HARQ process. The UE may flush the HARQ buffer of the first HARQ process.

In some implementations, the first HARQ process and the second HARQ process may operate on different radio resources (e.g., different BWPs, different cells, different carriers, and/or different resource pools).

In step S1622, the UE performs new HARQ transmission of the second MAC PDU with the second uplink grant. If this transmission is not positive acknowledged, in step S1624, the UE may perform HARQ retransmission of the second MAC PDU. If this transmission is positive acknowledged in step S1626, the UE considers HARQ transmission of the second MAC PDU successful.

Figure 17:
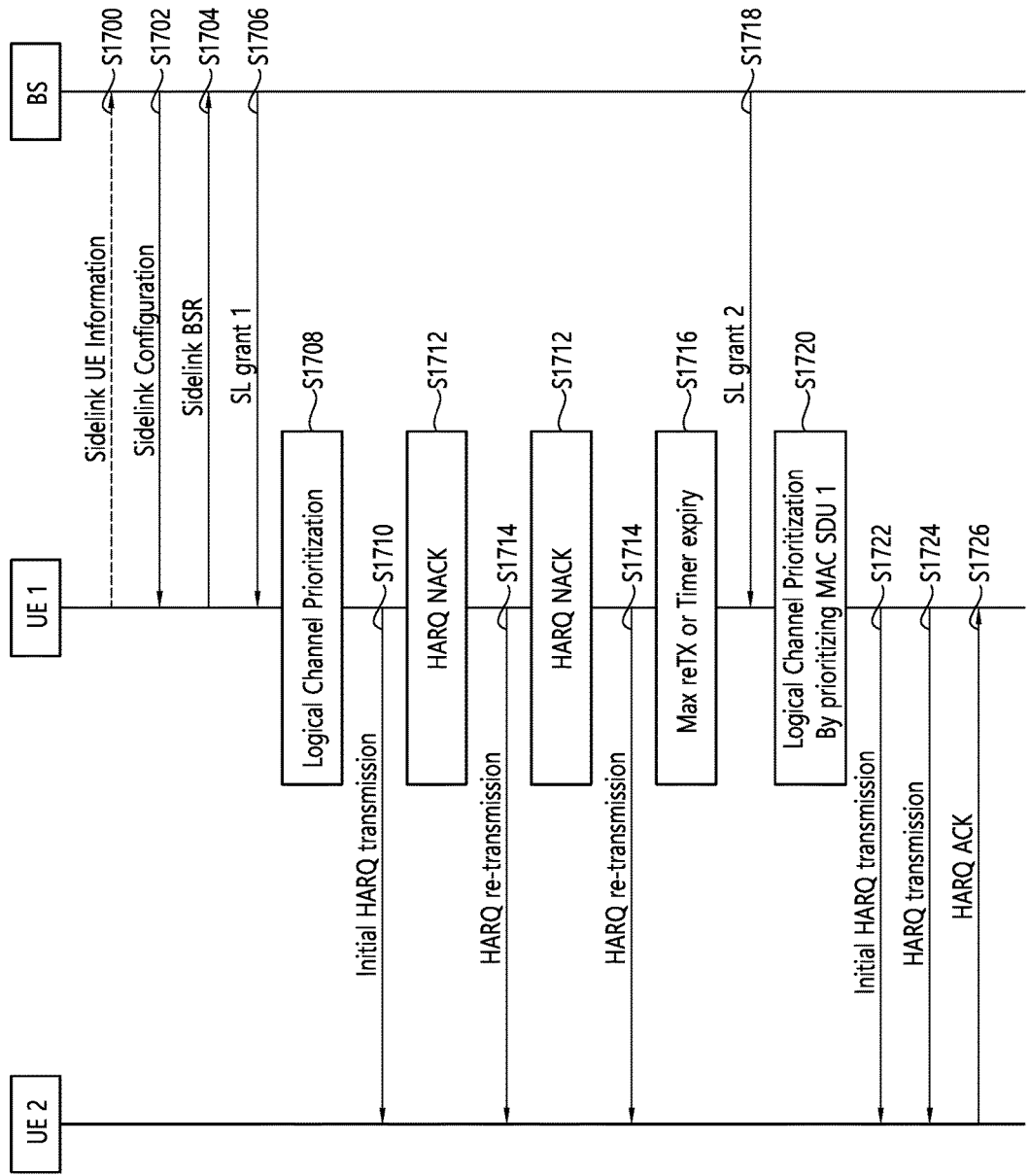
FIG. 17 shows an example of sidelink transmission of a MAC SDU according to implementations of the present disclosure.

FIG. 17 shows an example of sidelink transmission of a MAC SDU according to implementations of the present disclosure.

In step S1700, if the first UE is in RRC_CONNECTED and configured for gNB scheduled sidelink resource allocation (e.g., Mode 1 described above), the first UE may transmit sidelink UE information to the network. The sidelink UE information may include at least one of the followings: traffic pattern of service A, transmission (TX) carriers and/or reception (RX) carriers mapped to service A, QoS information related to service A (e.g., 5G QoS indicator (5QI), proximity-based services (ProSe)-per-packet priority (PPPP), ProSe-per-packet reliability (PPPR), QoS class indicator (QCI) value), service type of service A (e.g., unicast, groupcast, broadcast) and destination related to service A and/or another UE (e.g., destination ID, destination index or UE ID mapped to service A and/or another UE).

In step S1702, after receiving the sidelink UE information, the network may construct sidelink configuration. The sidelink configuration may include at least one of the followings: one or more resource pools for service A and/or unicast transmission with another UE and sidelink BSR configuration such as mapping between a logical channel group (LCG) and one or more QoS values or mapping between a LCG and the service type of Service A. The network may signal the sidelink configuration to the first UE and then the first UE may configure lower layers with sidelink configuration.

In step S1704, if a message becomes available in L2 buffer for sidelink transmission, the first UE may trigger SR for sidelink signaling (e.g., a particular PSCCH or sidelink connection establishment), so that the first UE transmits PUCCH resource mapped to sidelink signaling. If PUCCH resource is not configured, the first UE may perform random access procedure as the scheduling request. If an uplink grant is given at a result of the SR, the first UE may transmit sidelink BSR to the network. The sidelink BSR may indicate at least a destination index or UE index, a LCG, and a buffer size corresponding to the destination service, the destination group or the destination UE. The destination index may address the destination service, the destination group or the destination UE. The UE index may address the destination/receiving UE.

In step S1706, after receiving the SL BSR, the network may transmit a first sidelink grant (e.g., SL grant 1) to the first UE, e.g., by sending DCI in PDCCH. The DCI may include an allocated sidelink resource, the destination index and/or UE index. The index may be used to indicate the service A and/or another UE, explicitly or implicitly. If the first UE receives the DCI, the first UE may use the sidelink grant for transmission to another UE.

In some implementations, if the first UE is configured for UE autonomous scheduling of sidelink resource allocation (e.g., Mode 2 described above), the first UE may autonomously select or reselect sidelink resources to create a sidelink grant used for transmission to another UE.

In step S1708, the first UE performs LCP to construct the first MAC PDU based on the first sidelink grant. The first UE may include one or more MAC SDUs from one or more logical channels into the first MAC PDU. The first UE may deliver the first MAC PDU to the first HARQ process with the first sidelink grant. At least one MAC SDU of the first MAC PDU may be associated with a particular logical channel.

In some implementations, the particular logical channel may be prioritized, e.g. by the gNB. The particular logical channel may be indicated by a network. In some implementations, the particular logical channel may have a higher priority than a threshold indicated by a network. In some implementations, the particular logical channel may have a highest priority among multiple logical channels.

In some implementations, the first MAC SDU may have a higher priority than a threshold indicated by a network. In some implementations, the first MAC SDU may have a highest priority among multiple MAC SDUs.

In step S1710, the first UE performs HARQ transmission. If a HARQ transmission is not positively acknowledged in step S1712, if necessary in step S1714, the first UE may perform HARQ retransmissions of the first MAC PDU from the first HARQ process, if a grant is available for this retransmission.

In step S1716, the first UE may consider HARQ transmissions of the first MAC PDU is unsuccessful if one of the following conditions is met:
  when the number of maximum retransmissions of the first MAC PDU has reached without positive acknowledgement; or
  when a timer associated with the first MAC PDU expires without positive acknowledgement The first UE may start the timer associated with the first MAC PDU when the first UE performs the initial transmission of the first MAC PDU. The timer value may be configured by the gNB.

In step S1718, the first UE may receive the second sidelink grant (e.g., SL grant 2) from the gNB.

In step S1720, If HARQ transmission and/or retransmissions of the first MAC PDU is unsuccessful, if the MAC SDU included in the first MAC PDU is associated with the prioritized logical channel, and if the second sidelink grant is available, the first UE constructs a second MAC PDU including the MAC SDU for the second sidelink grant. When the first UE constructs the second MAC PDU, the first UE may perform logical channel prioritization to create the second MAC PDU by prioritizing the MAC SDU or initially including the MAC SDU in the second PDU.

In some implementations, the first UE may prioritize the MAC SDU by increasing the logical channel priority of the particular logical channel, e.g., with the highest priority in the LCP procedure.

In some implementations, the second MAC PDU may also include other MAC SDUs not contained in the first MAC PDU.

In some implementations, for this step, UE MAC may inform a UE RLC entity corresponding to the MAC SDU about NACK for the MAC SDU, about retrieval of the MAC SDU and/or about retransmission of the MAC SDU. In this case, the RLC entity may not perform ARQ retransmission of the MAC SDU.

In some implementations, UE MAC may retrieve the MAC SDU from the first HARQ process and/or RLC buffer of the RLC entity.

In some implementations, the first UE may deliver the second MAC PDU to the second HARQ process with the second sidelink grant.

In some implementations, the first HARQ process may be equal to the second HARQ process. The first UE may flush the HARQ buffer of the first HARQ process.

In some implementations, the first HARQ process and the second HARQ process may operate on different radio resources (e.g., different BWPs, different cells, different carriers, and/or different resource pools).

In step S1722, the UE performs new HARQ transmission of the second MAC PDU with the second sidelink grant. If this transmission is not positive acknowledged, in step S1724, the first UE may perform HARQ retransmission of the second MAC PDU. If this transmission is positive acknowledged in step S1726, the first UE considers HARQ transmission of the second MAC PDU successful.

The present disclosure can have various advantageous effects.

For example, a wireless device performing HARQ transmission by using radio resources for delivery of a packet requiring low latency and high reliability can quickly retransmit the packet by reconstructing a new MAC PDU, in particular when the packet is prioritized by the network and radio resource is available for transmission of the reconstructed MAC PDU.

For example, the system can provide fast and reliable delivery of data transmission for a wireless device performing HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method for a wireless device in a wireless communication system, the method comprising:
   triggering a Scheduling Request (SR) to acquire a first uplink grant from a base station;
   receiving the first uplink grant from the base station;
   transmitting a Buffer Status Report (BSR) Medium Access Control (MAC) Control Element (CE) by using the first uplink grant to indicate a buffer size for a specific logical channel;
   receiving a second uplink grant from the base station;
   constructing a first MAC protocol data unit (PDU) based on the second uplink grant,
   wherein the first MAC PDU includes a first service data unit (SDU) from the specific logical channel;
   delivering the first MAC PDU to a first hybrid automatic repeat request (HARQ) process with the second uplink grant;
   performing transmission of the first PDU including the first SDU based on the first HARQ process with the second uplink grant;
   determining that the first HARQ process for the first PDU is unsuccessful, based on that the number of transmission of the first PDU was reached to a maximum number without receiving positive acknowledgement;
   receiving a third uplink grant from the base station;
   prioritizing the first MAC SDU by increasing a logical channel priority of the specific logical channel to have a highest priority based on determining that the first HARQ process for the first PDU is unsuccessful;
   constructing a second PDU including the first SDU based on the third uplink grant; and
   performing transmission of the second PDU including the first SDU based on the second HARQ process.

2. The method of claim 1, wherein the first HARQ process for the first PDU is determined to be unsuccessful based on expiry of a timer associated with the first MAC PDU without receiving a positive acknowledgement.

3. The method of claim 2, wherein the timer associated with the first MAC PDU starts upon performing an initial transmission of the first MAC PDU.

4. The method of claim 1, wherein the second MAC PDU includes a second MAC SDU different from the first SDU.

5. The method of claim 1, wherein the wireless device is in communication with at least one of a mobile device, a network, and/or autonomous vehicles other than the wireless device.

6. A wireless device in a wireless communication system, comprising:
　at least one transceiver;
　at least processor; and
　at least one computer memory operably connectable to the at least one processor and storing instructions that, based on being executed by the at least one processor, perform operations comprising:
　　triggering a Scheduling Request (SR) to acquire a first uplink grant from a base station;
　　receiving the first uplink grant from the base station;
　　transmitting a Buffer Status Report (BSR) Medium Access Control (MAC) Control Element (CE) by using the first uplink grant to indicate a buffer size for a specific logical channel;
　　receiving a second uplink grant from the base station;
　　constructing a first MAC protocol data unit (PDU) based on the second uplink grant,
　　wherein the first MAC PDU includes a first service data unit (SDU) from the specific logical channel;
　　delivering the first MAC PDU to a first hybrid automatic repeat request (HARQ) process with the second uplink grant;
　　performing transmission of the first PDU including the first SDU based on the first HARQ process with the second uplink grant;
　　determining that the first HARQ process for the first PDU is unsuccessful, based on that the number of transmission of the first PDU was reached to a maximum number without receiving positive acknowledgement;
　　receiving a third uplink grant from the base station;
　　prioritizing the first MAC SDU by increasing a logical channel priority of the specific logical channel to have a highest priority based on determining that the first HARQ process for the first PDU is unsuccessful;
　　constructing a second PDU including the first SDU based on the third uplink grant; and
　　performing transmission of the second PDU including the first SDU based on the second HARQ process.

* * * * *